United States Patent
Bryant et al.

[15] 3,680,088
[45] July 25, 1972

[54] RECURSIVE INTEGRATOR

[72] Inventors: Kenneth Owen Bryant, Ridgecrest; William R. Morrow, Inyokern; Vernon J. Logue, Ridgecrest, all of Calif.

[73] Assignee: The United States of America as represented by the Secretary of the Navy

[22] Filed: March 30, 1970

[21] Appl. No.: 23,645

[52] U.S. Cl. .................................................343/5 DP
[51] Int. Cl. .................................................G01s 9/02
[58] Field of Search ....................................343/5 DP

[56] References Cited

UNITED STATES PATENTS 3,206,747   9/1965   Caspers ...........................343/5 DP
3,353,177   11/1967   Wilmot ............................343/5 DP
3,422,435   1/1969   Cragon et al. ...................343/5 DP

*Primary Examiner*—Malcolm F. Hubler
*Attorney*—R. S. Sciascia and Roy Miller

[57] ABSTRACT

An apparatus and method for weighting new and stored radar information. For each hit (or detected noise pulse), a quantizer sends a digital signal to a corresponding storage bin. The information from the current signal and respective previous signals is accumulated, recorded in a memory circuit for future retrieval and sent to a detection circuit which provides an output. After a predetermined number of hits the accumulation is divided by two, thereby effectively reducing the influence of previous signals while retaining their significance.

6 Claims, 2 Drawing Figures

[3,680,088]

RECURSIVE INTEGRATOR

GOVERNMENT INTEREST

The invention described herein may be manufactured and used by or for the Government of the United States of America for governmental purposes without the payment of any royalties thereon or therefore.

BACKGROUND OF THE INVENTION

In the field of radar target detection, one of the major problems has been in improving the probability of detection, particularly for a low signal to noise ratio situation. Prior devices utilize reset integrators in which all of the stored data is reset to zero after a selected number of radar interpulse periods. With such a device, when the target appears at the moment in which the stored data is reset to zero the probability of detection is relatively high. If the target appears at any other time, however, and the expected hits on the target equals the number of samples in any integration period, the probability of detection is relatively low since the accumulated integrated information output will often fail to reach the threshold detection level.

The present invention improves the probability of target detection by dividing the past accumulated integrated information by two at the end of an integration period rather than resetting all the stored data to zero. By utilizing the invention, a target appearing midway through the integration period N and being present N pulse periods, (the case of lowest probability of detection for the reset integrator), will probably be detected since the accumulated integrated information output will likely exceed the threshold detection level.

DESCRIPTION OF THE PREFERRED EMBODIMENT

Figure 1:
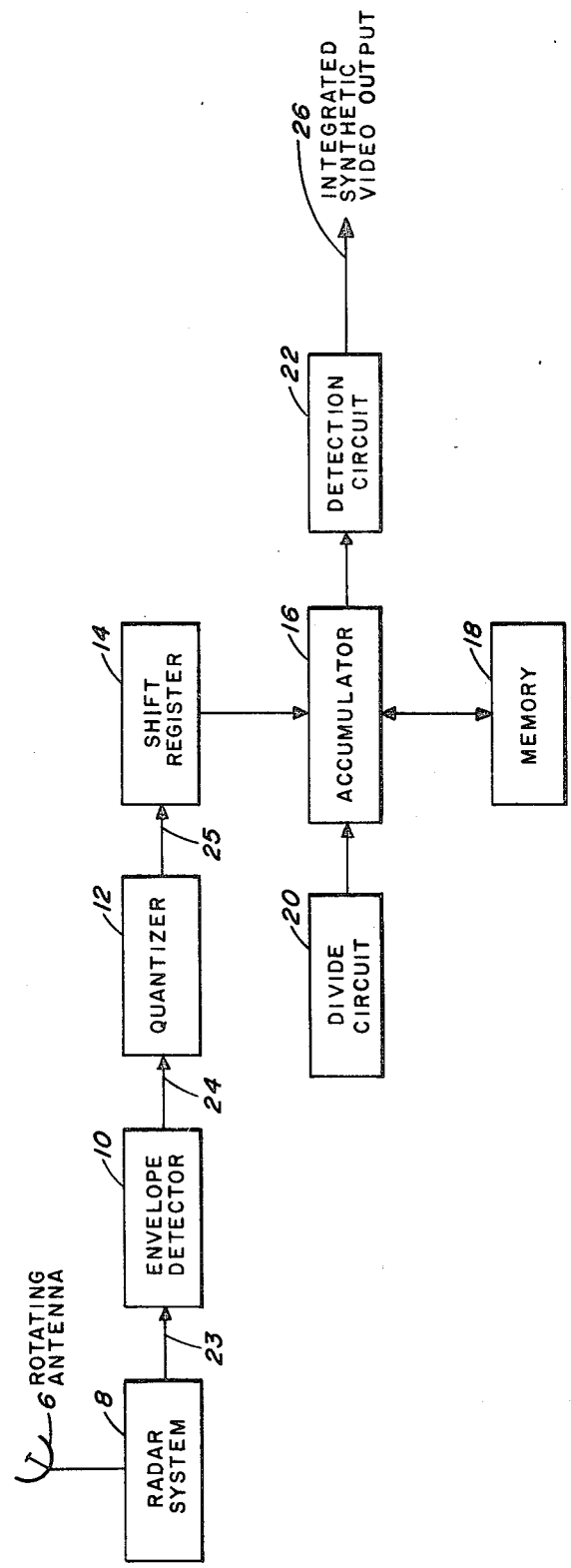
FIG. 1 is a block diagram of the invention.

Referring to FIG. 1 the recursive integrator comprises a rotating antenna 6, a radar system 8, an envelope detector 10, a quantizer 12, a shift register 14, an accumulator 16, a memory 18, a divide circuit 20, and a detection circuit 22, providing an integrated synthetic video output 26.

A return signal from the target is received by the rotating antenna 6 and adapted by radar system 8 to provide an intermediate frequency output plus noise 23. The envelope detector 10 receives the IF signal plus noise 23 as an input and provides a unipolar video signal 24 as an output. The quantizer 12 converts the unipolar video output 24 into a binary video signal 25 which is supplied to the shift register 14. The information in the binary video signal 25 is in the form of binary digits, called bits.

After receiving a predetermined number of bits the shift register 14 transfers the information contained therein to the accumulator 16. The shift register then receives the next interval period of additional bits, called a cell.

In the accumulator 16, information from the previous corresponding cells, supplied by memory 18 is added to the current cell sample. The output is compared to a predetermined threshold level in the detection circuit 22, which provides the system output 26.

After a predetermined number of interpulse periods the divide circuit 20 is activated and effectively divides the accumulated integrator output from accumulator 16 by a factor of two. The divide register 20 is activated only once every N interpulse periods where N is the integration time.

Figure 2:
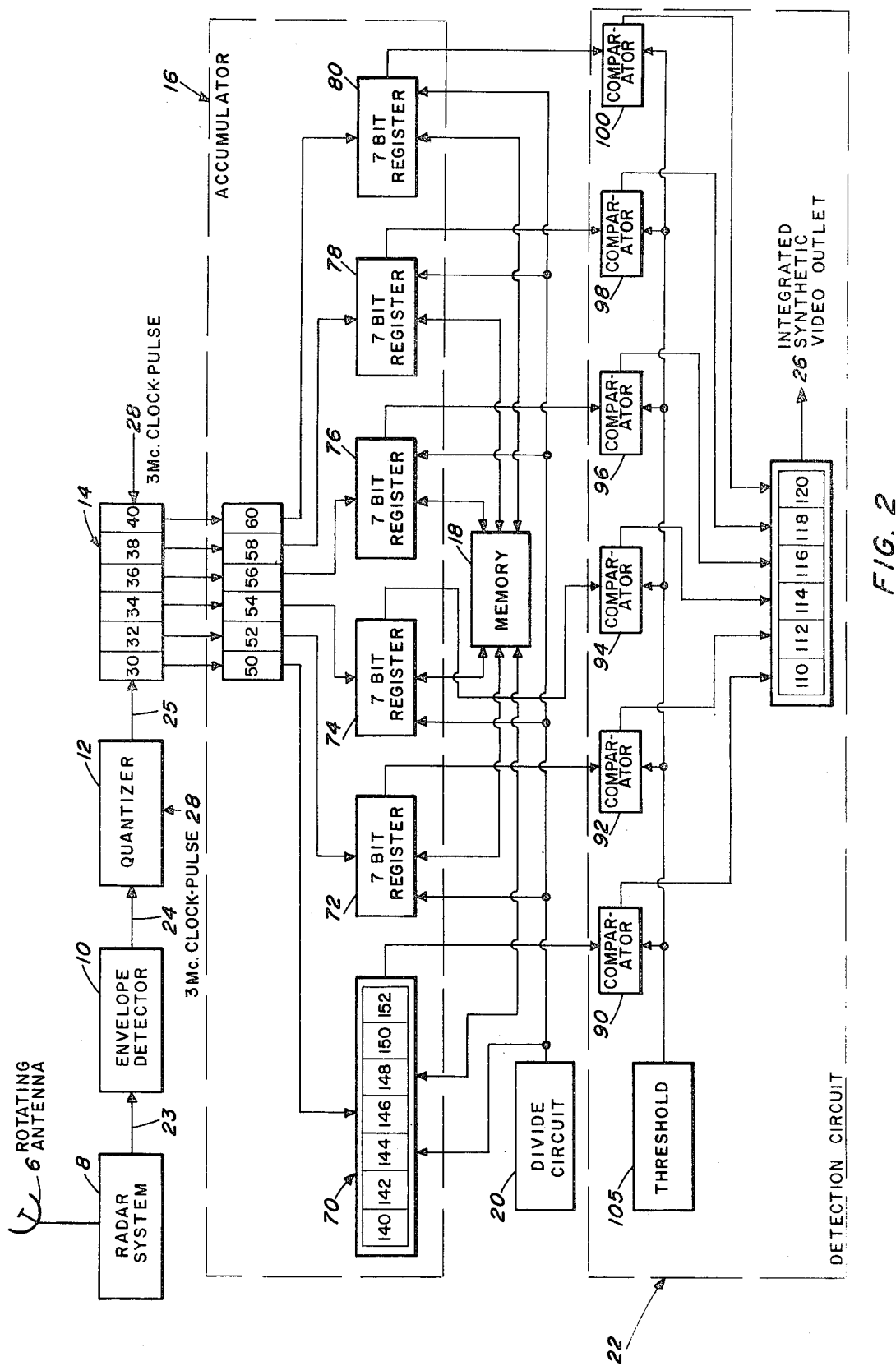
FIG. 2 is a block diagram of the invention in greater detail.

Referring now to FIG. 2 wherein the shift register 14, the accumulator 16, the divide circuit 20 and the detection circuit 22 are shown in greater detail. By way of example, shift register 14 has six information bins which are consecutively filled by bits of the binary video signal 25. After each six sample bits, the bits are transferred in parallel to bins 50 – 60 where they are held for accumulation in respective registers 70 – 80 of the accumulator 16. The shift register 14 will continue shifting to receive the next following six samples of binary video. A 3 megacycle clockpulse 28 is used to provide an appropriate timing system to the device.

Each register 70 – 80 is a seven-bit binary accumulator capable of counting to $2^7 - 1$, or 127. Summed values of respective samples of prior interval periods, called ensembles, are transferred from memory 18 to the corresponding bin accumulators and added to the respective current bits. As an example, prior bits from bin 50 are stored in memory 18 for use in register 70. The resulting ensemble values are transferred serially to detection circuit 22 and, in parallel, to memory 18.

In the detection circuit 22 each ensemble is evaluated by a predetermined criterion, threshold 105. For each ensemble in comparators 90 – 100 that exceeds the criterion, a digital ONE is produced, but for each ensemble that is less than the criterion, a digital ZERO is produced. The resulting integrated synthetic video output 26 is displayed on a monitor and transferred to a target evaluation circuit.

An an example of the operation of the accumulator 16, memory 18, and divide registers 20, the following discussion will be in reference to bin 50, seven-bit register 70, and the respective memory 18 and divide circuit 20.

An information bit value transferred from shift register 14 is stored in bin 50 even as shift register 14 is shifted to receive new information bits. The bit value in bin 50 is added to the accumulated bit value in seven-bit register 70. Register 70 is a binary digit counter wherein a ONE in bit 140 signifies a value of 64. The resultant value is simultaneously sent to detection circuit 22 and stored in memory 18 for future accumulations.

After a predetermined number of interpulse periods in which bit values in bin 50 are added to the accumulated values in seven-bit register 70, divide circuit 20 effectively divides the sum by two by shifting the binary digit counter in seven-bit register 70 one position toward the least significant bit. For example, if the accumulated value is 32 at the time of the division, that is, a one in cell 142 followed by five zeroes in cells 144 – 152, the accumulated value is divided by two by shifting the binary digit ONE from cell 142 to 144. A ONE in cell 144 denotes a value of 16.

The advantages of the invention are a reduced component count, and thereby a reduced cost of production, over most integrating devices, and the utilization of all information bits with the most recent being given greater influence. By dividing the accumulated integrated information by two rather than resetting the stored information to zero the system retains the previous information but reduces its influence, improves the signal to noise ratio, and increases the probability of target detection.

What is claimed is:

1. A video pulse processor for receiving radar echo pulses and preparing said pulses for display and input to a target evaluation circuit comprising:
    a binary digit providing means for receiving said echo pulses as an input and providing said pulse information in the form of binary digits as an output,
    means for receiving and storing the information from previous and current pulses, including means for providing as an output the information stored,
    means for accumulating the outputs of said binary digit providing means and said receiving and storing means and providing the accumulation as an output,
    means for weighting the accumulated information from said binary digit providing means and said receiving and storing means so that the information from said binary digit providing means will be more significant in the output of said pulse video processor than any single previous pulse, including means for periodically reducing said accumulated output to a value other than zero, and
    means for receiving said weighted accumulated outputs and providing an output of information suitable for use by a target evaluation circuit.

2. The processor of claim 1 wherein said reducing means periodically divides the accumulated output by two.

3. The processor of claim 2 wherein said reducing means shifts said accumulator one binary digit cell to accomplish said division.

4. A method of video processing radar echo pulses for display and output to a target evaluation circuit comprising;

receiving said echo pulses containing information, converting said pulse information into binary digit information, accumulating said binary digit information from previous and current said echo pulses, weighting said accumulated information by periodically reducing said accumulated information to a value other than zero so that the information from said current pulse is more significant to said accumulated information than any single previous pulse, storing said weighted accumulated information for use in future accumulation as said previous echo pulses, and outputting said weighted accumulated information in a form suitable for use by a target evaluation circuit.

5. The method of claim 4 wherein said weighting step comprises;

periodically dividing the accumulated information by two.

6. The method of claim 5 wherein said accumulated information is divided by two only once every 64 accumulations.

* * * * *